United States Patent [19]

Blaser

[11] 4,420,036

[45] Dec. 13, 1983

[54] ENERGY EFFICIENT HOUSING STRUCTURE

[76] Inventor: Lee B. Blaser, 8829 S. William Cody Dr., Evergreen, Colo. 80439

[21] Appl. No.: 245,585

[22] Filed: Mar. 19, 1981

[51] Int. Cl.³ .............................................. F24J 3/02
[52] U.S. Cl. ..................................... 165/45; 126/430; 126/431
[58] Field of Search .................. 165/45; 126/430, 431

[56] References Cited

U.S. PATENT DOCUMENTS

| | | | |
|---|---|---|---|
| 2,119,038 | 5/1938 | Bell | 165/45 |
| 2,210,960 | 8/1940 | St. Pierre | 165/45 X |
| 2,427,780 | 9/1947 | Haines | 165/45 X |
| 2,559,868 | 7/1951 | Gay | 165/45 X |
| 2,559,869 | 7/1951 | Gay | 237/50 |
| 2,559,870 | 7/1951 | Gay | 165/45 |
| 2,680,354 | 6/1954 | Gygax | 165/45 |
| 3,412,728 | 11/1968 | Thomason . | |
| 3,894,369 | 7/1975 | Schmitt et al. | 52/173 |
| 3,994,276 | 11/1976 | Pulver | 126/431 X |
| 4,006,856 | 2/1977 | Nilsson | 126/430 X |
| 4,054,246 | 10/1977 | Johnson . | |
| 4,119,084 | 10/1978 | Eckels . | |
| 4,141,498 | 2/1979 | Marschner | 165/45 X |
| 4,143,815 | 3/1979 | Meysenburg | 237/2 B |
| 4,147,300 | 4/1979 | Milburn, Jr. . | |
| 4,173,304 | 11/1979 | Johnson | 126/430 |
| 4,207,865 | 6/1980 | Allen | 126/431 |
| 4,212,292 | 7/1980 | Reinert | 126/449 |
| 4,295,415 | 10/1981 | Schneider, Jr. | 126/430 |
| 4,323,113 | 4/1982 | Troyer | 165/45 |
| 4,324,289 | 4/1982 | Lahti | 126/430 X |

Primary Examiner—Sheldon J. Richter
Attorney, Agent, or Firm—John E. Reilly

[57] ABSTRACT

An energy efficient housing structure combines the desirable features of earth coupling with an outer air circulation envelope which is further combined with a chase or main air circulation conduit extending from the earth-coupled section of the envelope into the roof section. Solar heat is transmitted directly into a thermal storage area in earth-coupled relation along the southern exposed portion of the housing structure and a clerestory is operative to transmit solar radiation directly onto the northern wall of the envelope for the housing structure.

20 Claims, 7 Drawing Figures

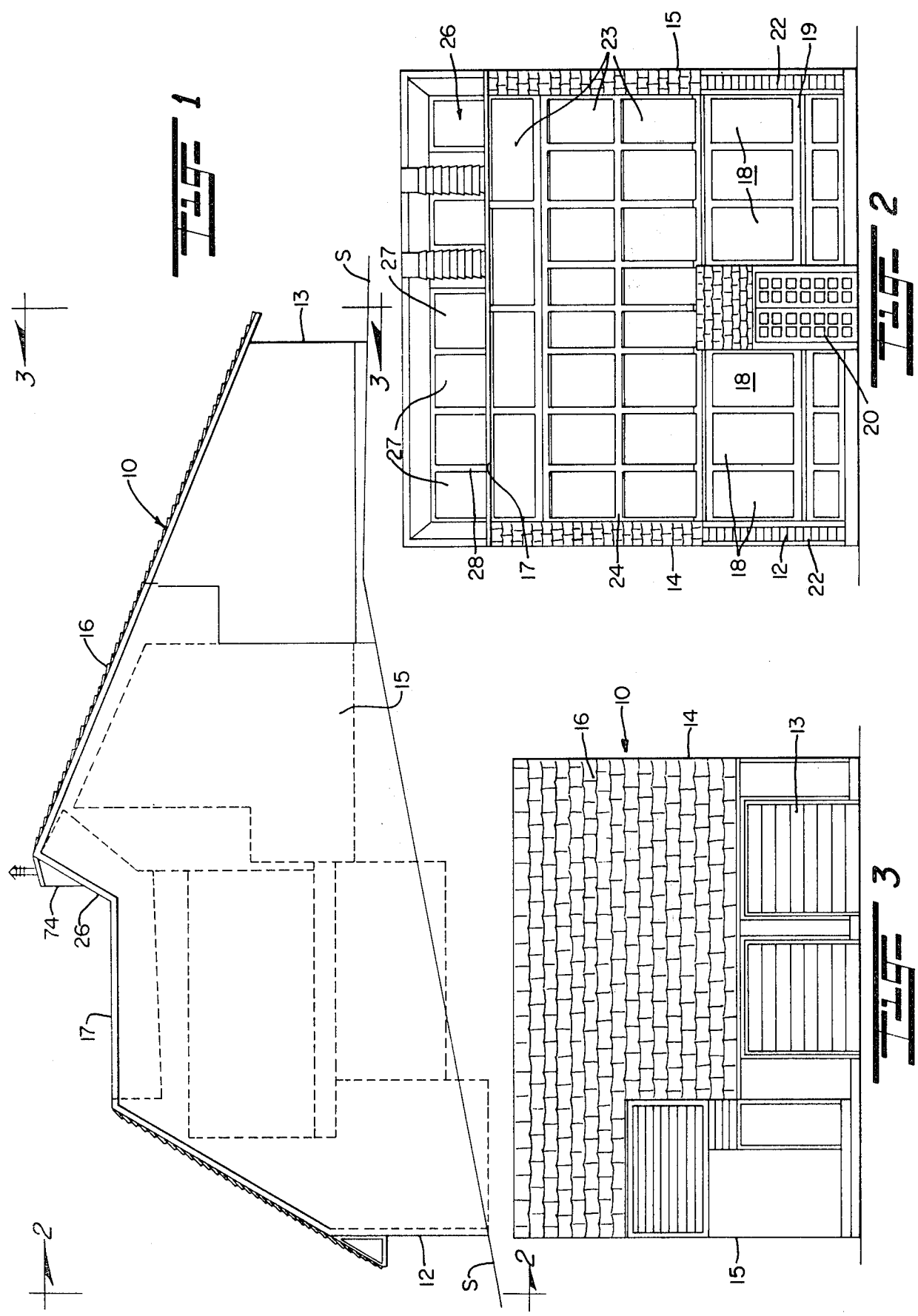

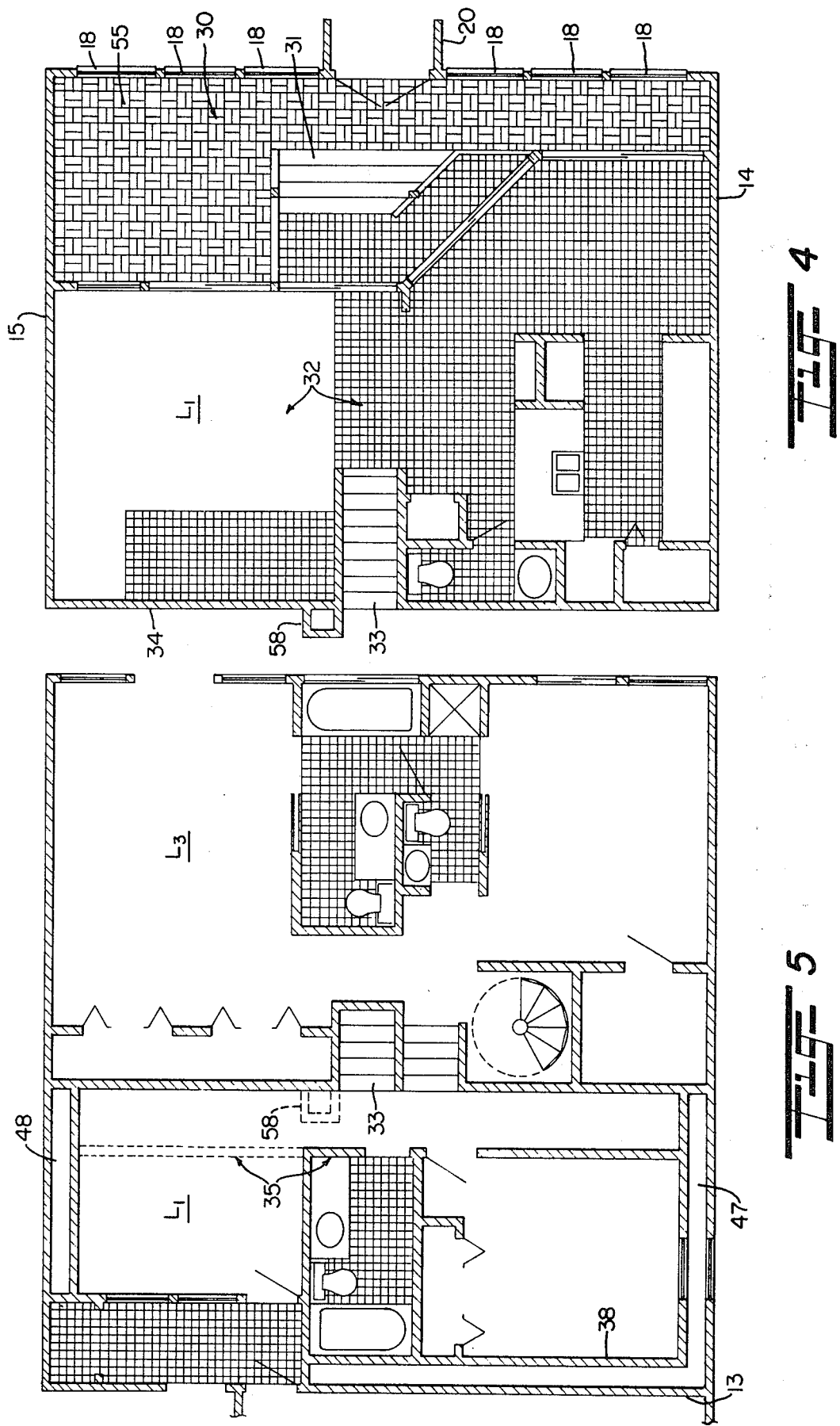

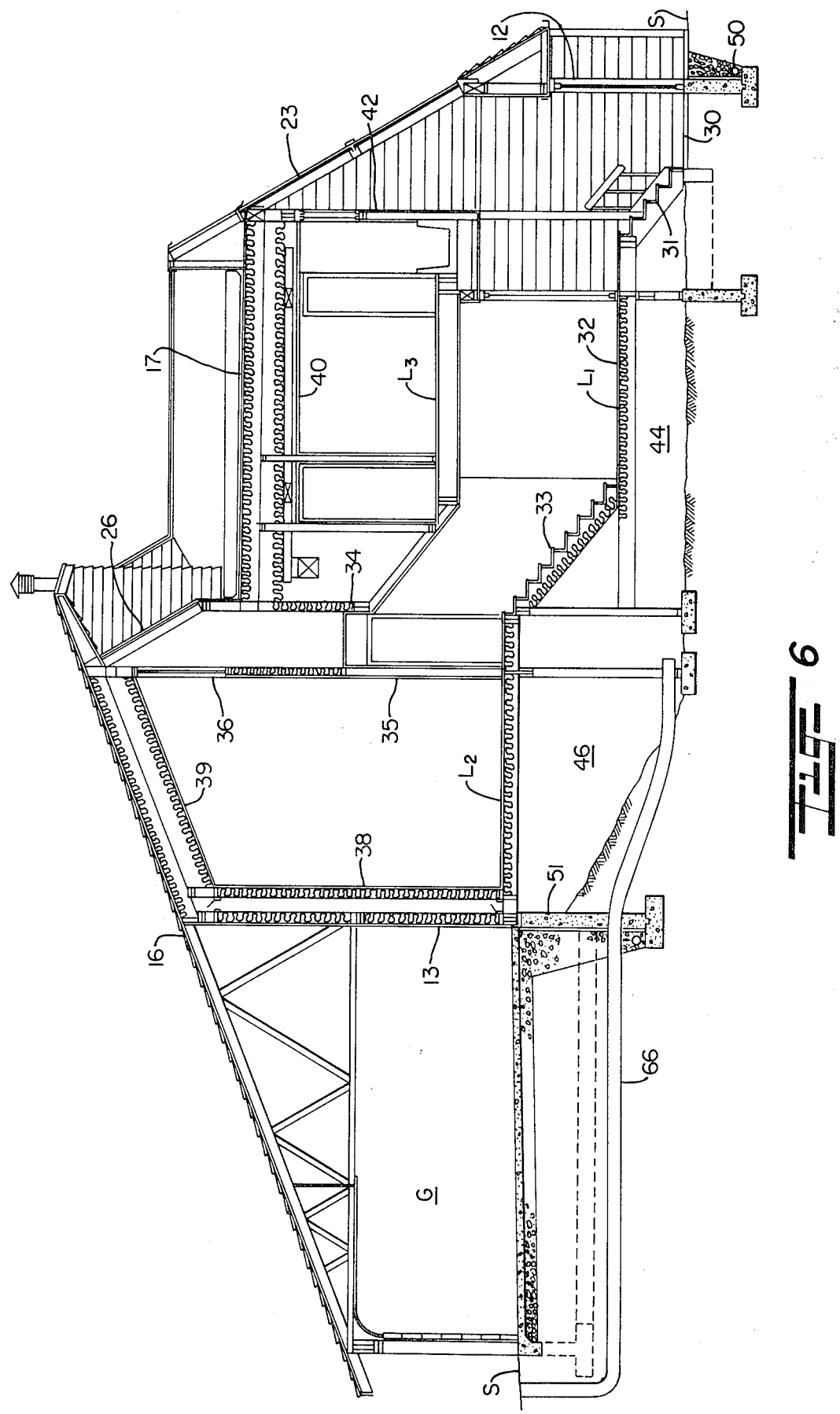

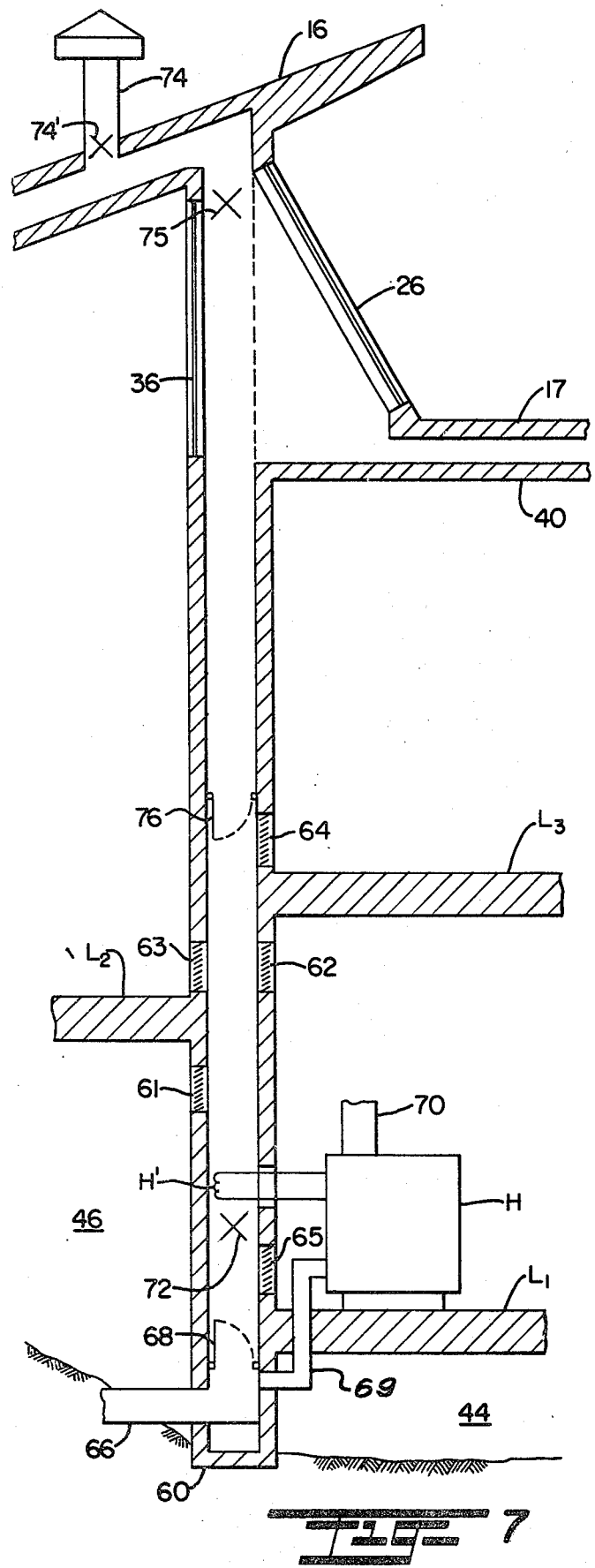

ENERGY EFFICIENT HOUSING STRUCTURE

This invention relates to energy efficient building structures and more particularly relates to a novel and improved earth-coupled, solar-heated envelope housing structure capable of uniformly distributing heated or cooled air throughout the entire structure.

BACKGROUND AND FIELD OF THE INVENTION

Envelope housing is broadly characterized by having spaced inner and outer insulating walls which form an air circulating space around the roof and wall sections of a building as well as the lower space contiguous to the earth. For instance, the envelope house may include a passive solar heating system on the southern exposed portion, a double wall on the north and heavily insulated single walls on the east and west portions. The sourthern exposed portion and the northern wall are connected to a lower air space and double ceiling in a manner which permits air to flow freely along all of the surfaces on the south, north, top and bottom of the structure. Envelope houses of the type described have also been employed in combination with earth-coupled lower air spaces; or in other words, the lower space is extended beneath the frost line so as to maintain the optimum mean temperature conditions in the lower space. For instance, in colder climates where the outside air temperature may vary as much as 100° F. to 120° F. from summer to winter, the temperature of the earth below the frost line will undergo little or no variation. Thus, notwithstanding a swing in temperature between 0° F. and 100° F., the variation in the earth temperature four feet below the earth's surface will be on the order of 45° F. to 55° F. Utilization of this earth-coupled effect as a part of the air circulating space for the envelope housing enables the earth to moderate the envelope's natural heat loss to the outside at night, or during cool spells. Since the envelope constitutes a mini-environment around the main living space or area of a house, its temperature can be maintained at or above the mean temperature of the lower space so long as there is uniform distribution of air throughout the envelope. As a result, any external heating source utilized, whether it be solar heating or otherwise, need only compensate for the temperature differential between the mean temperature of the earth below the frost line and the desired temperature level in the room air spaces of the housing.

It is known to utilize solar energy as a heat source in combination with envelope housing in order to elevate the temperature of the air circulating through the envelope and to transfer it to the earth for storage and for subsequent use as a heat supply supplementary to the heat of the earth and in this way minimize requirements for other auxiliary heat sources. Representative of such housing is the housing structure disclosed in U.S. Pat. No. 2,559,869 to Gay. This intent ignores the great difference between the specific heat of air and that of earth. Because of that difference, it is very difficult to heat earth with air, but very easy to heat air with earth. Major drawbacks in the utilization of solar heating systems, particularly those of the passive variety, are that they are somewhat localized in the sense that their rays are concentrated on the southern exposed sides of a house. Even where sophisticated heat storage systems are employed, it is difficult to achieve uniform temperature levels throughout the house, especially along the northern wall which typically is not exposed directly to sunlight. Envelope housing employed in combination with solar heating affords one means of improved air circulation, at least around the perimeter of the house, but nevertheless has not in the past achieved uniform air circulation throughout the entire structure. For example, U.S. Pat. No. 4,207,865 to Allen in which a passive solar system takes the form of a clerestory for directing heat onto a central partition and has incorporated in the partition a fluid circuit line. Among other things, the fluid circuit line is capable of distribution of heat from a central or intermediate heat source but falls short of uniform air circulation which is required throughout the year. Other representative patents are U.S. Pat. Nos. 3,142,728 to Thomason; 3,894,369 to Schmitt et al; 4,054,246 to Johnson; 4,119,084 to Eckels; 4,143,815 to Meysenburg; and 4,147,300 to Milburn, Jr.

SUMMARY OF THE INVENTION

It is an object of the present invention to provide for a novel and improved air envelope system for a housing structure.

Another object of the present invention is to provide for a novel and improved envelope housing structure which is earth-coupled and makes provision for novel and improved means of air circulation uniformly throughout and around the housing structure.

A further object of the present invention is to provide for a novel and improved housing structure in which a novel and improved passive solar heating system has been devised which is capable of directing solar radiation over the greatest possible extent of the housing structure without substantial modification of conventional housing designs or construction techniques.

An additional object of the present invention is to provide for a novel and improved air envelope system for a housing structure which is earth-coupled and is capable of air circulation uniformly throughout all rooms of the housing structure while incorporating therein novel and improved passive solar heating and thermal storage; and further wherein a building structure has substantial portions of the interior space exposed to passive solar heating while permitting effective partitioning and subdivision of the building structure into separate living areas.

In accordance with the present invention, there has been devised an air envelope housing structure which in a preferred embodiment is employed in a split-level home having first and second passive solar heating sections, the first directing solar radiation through the southern exposed portion of the housing and the second being in the form of a clerestory which extends along a raised section of the building and permits solar radiation to be directed into the north section of the building. A vertical conduit or chase extends upwardly from a lower air space upwardly into communication with the air envelope in its extension along the roof section. The lower end of the chase can communicate either with the crawl space area or with an outside source of air, and air-circulating means controls the direction and amount of air circulation through the chase. Air vents along the chase communicate with the room air spaces so as to direct the desired amount of air away from the envelope into individual rooms while permitting continued circulation of air through the envelope. Accordingly, the chase can effectuate cooling of the entire building area by drawing air from the outside, such as, through an earth-moderated cooling duct; or when the cooling duct is closed will circulate air through the upper, warmest portions of the envelope and into individual rooms. The passive solar collector along the southern exposed portion of the house is further characterized by a heat storage area which forms an extension of the crawl space and is directly exposed to solar radiation passing through the first solar collector and in direct communication with the air envelope.

The above and other objects, advantages and features of the present invention will become more readily appreciated and understood from the foregoing detailed description of a preferred embodiment when taken together with the accompanying drawings, in which:

BRIEF DESCRIPTION OF THE DRAWINGS

FIG. 1 is a side view of a preferred embodiment of the present invention;

FIG. 2 is a front view elevation of the preferred embodiment shown in FIG. 1;

FIG. 3 is a rear view in elevation of the preferred embodiment of the housing structure shown in FIG. 1;

FIG. 4 is a floor plan of the lower area of the preferred form of housing structure shown in FIG. 1;

FIG. 5 is a floor plan of the upper levels of a housing structure in the preferred embodiment of FIG. 1;

FIG. 6 is a cross-sectional view of the preferred form of housing structure;

FIG. 7 is another cross-sectional view with portions broken away to illustrate the disposition and arrangement of the air distribution chase in the preferred embodiment of the present invention.

DETAILED DESCRIPTION OF A PREFERRED EMBODIMENT

Referring in more detail to the drawings, the present invention is best exemplified by its use in a split-level home which is shown incorporating the novel features and advantages of the present invention. It will be evident, however, that the principles of the present invention are conformable for use in a wide variety of different house plans and other building structures, such as, for instance, single story or multi-story dwellings.

The housing structure 10 as generally depicted in FIGS. 1 to 3 is broadly comprised of front and rear walls 12 and 13, opposite sidewalls 14 and 15, together with upper and lowr adjoining roof sections 16 and 17, respectively. The front wall 12 includes a lower vertical wall section comprised of glazing panels 18 of generally rectangular configuration interconnected by a wooden frame 19, a central doorway 20 and siding 22 which flanks opposite sides of the glazing panels 18. A steeply pitched, upper front wall section is similarly comprised of a series of glazing panels 23 which are arranged in two rows interconnected by wood frame 24 and which slope upwardly and rearwardly from the lower front vertical wall section as described. In the form shown, the upper and lower roof sections 16 and 17 are separated by a clerestory 26, the latter defined by sloped glazing panels 27 and which are interconnected by a wood frame 28. The glazing panels 27 are sloped at a relatively steep pitch, alos, so that in a manner to be described they will be capable of exposing the northern wall of the housing to solar radiation, or in other words will permit the rays of the sun to pass directly through the clerestory 26 onto the northern wall.

For the purpose of illustration and not limitation, the interior of the housing 10 as seen from FIGS. 4 to 6 may be comprised of a lower greenhouse level 30 directly adjacent to the front wall 12, and a stairway 31 leads upwardly into a first level 32 which is typically divided into separate living areas, such as, a kitchen, living room and dining room. As shown in FIGS. 4, 5 and 6, the first level $L_1$ has a stairway 33 leading upwardly into a second level $L_2$, and a third level $L_3$ is disposed directly above the first level, each level being suitably divided into separate living areas. A central partition 34 extends vertically between the first level and second level and another partition 35 extends between the second level and third level, the partitions 34 and 35 being spaced from one another and extending upwardly into opposite upper and lower edges of the clerestory 26. Moreover, the partition 35 is provided with a glazing layer or panel 36 in facing relation to the clerestory 26 to admit light passing through the clerestory directly onto the interior wall 38.

The rear wall 13 comprises the exterior building wall contiguous to a garage G, and an inner spaced insulating wall 38 extends upwardly from the second level into an inner spaced interior wall or ceiling 39 beneath the upper roof section 16. The upper edge of the partition 35 terminates at the ceiling 39, and the partition 34 terminates in an upper edge flush with the ceiling 40 which is disposed in inner spaced relation to the lower roof section 17. Another front partition wall 42 extends along the front of the third level and terminates at the ceiling 40 at its upper edge and may further extend downwardly from the second level across the front end of the first level as shown, except where interrupted by the lower stairway 31. Although forming no part of the present invention, the garage area G is depicted as forming an extension from the rear or northern wall 13 of the dwelling.

Most important to a consideration of the floor plan and arrangement of the various levels is that from the front to the rear of the housing structure an uninterrupted conduit or path of movement is established permitting air flow in sheet form inside and along the rear or northerly exterior wall 13, upper roof section 16, clerestory 26, lower roof section 17 and front or southern wall 12. This path is completed by the lower space beneath the ground level represented at S, and which consists of a crawl space area 44 beneath the first level $L_1$ and crawl space area 46 beneath the second level $L_2$ and which areas 44 and 46 are in open communication with one another so as to effectively establish a cavity for the movement of air around the perimeter of the house. If desired, this may be further complemented by additional envelope sections along at least portions of opposite sidewalls of the house as represented at 47 and 48 in FIG. 5 and which communicate with the flow path extending along the rear wall 13 and upper roof section 16, respectively.

The earth-coupling in the housing structure as shown is established by extensions on the foundation, for example as represented at 50 and 51 in FIG. 6 beneath the frost line completely around the perimeter of the house. Typically, this frost line may extend four feet below the earth's surface, and it is therefore important to couple the air flow through the envelope in open communication with the earth within the crawl space so that the earth moderates the envelope's natural heat loss to the outside at night, or during cool or cloudy spells. Since the earth below the frost line exhibits an average temperature at or slightly above the mean annual temperature, earth-coupling in the manner shown and described will insure that the heated portions of the house never drop below the mean temperature of that particular climate. In the envelope system illustrated, the mean temperature of the crawl space earth is substantially increased by positioning of a heat storage mass in direct communication with the crawl space areas and at a location in which it is exposed directly to the sun's rays passing through the glazing panels along the front wall section. This can be achieved by constructing the floor of the greenhouse area 30 with a heat storage mass, such as, a cross-laid ceramic tile or brick floor as represented at 55 and which, as best seen from FIG. 4, traverses the entire front ground floor level of the housing structure. The heat storage mass is capable of absorbing and retaining heat in a carefully designed ratio to solar gain and room volumes of the living space and serves to inhibit excessive heat gain in a sunlit room by absorbing it at a predictable rate. Moreover, the mass 55 prolongs the solar effect by releasing heat when the room cools below the temperature of the mass, again at a predictable rate. During the winter season when the sun is at a relatively low angle, the floor of the lower space can be heated directly by the sun to a substantial depth on the order of five to seven feet under the main living space. Thus, by constructing the lower part of the living area floor three to four feet above the greenhouse level, the thermal mass section of brick and rock laid directly on the earth is heated by direct solar radiation and may constitute 35% to 40% of the entire area under the structure.

In order to achieve controlled and uniform circulation of the air through the living spaces of the housing structure, a chase or vertical duct 58 extends from a point intermediately between the crawl spaces 44 and 46 and in communication therewith to a point in communication with the envelope intermediately between the upper and lower roof sections 16 and 17. Here, the duct 58 is arranged for extension between the partitions 34 and 35 and directly to one side of the stairway 33. From a consideration of FIGS. 6 and 7, it will be noted that the duct 58 terminates in a lower closed end portion 60 in the crawl space area and includes an opening 61 which is in communication with the crawl space 46. Vents 62, 63 and 64 are located at spaced intervals along the length of the chase 58 to communicate with the room air spaces. A cooling duct 66 extends from the lower end of the chase 58 substantially horizontally and upwardly into communication with outside air, and a damper represented at 68 is located directly above the entrance of the cooling duct 66 to control admission of air from the outside. Another duct 69 extends from the lower end of the chase into a suitable heat source H merely for the purpose of providing combustion air to heat source H, which in the preferred embodiment is a woodburning stove. Still another auxiliary heat source represented at H' may be located in the chase and may consist of hydronic heat pipes permitting the woodburning stove to selectively heat the air and circulate it through the chase. As a further back-up to the passive solar collectors and woodburning stove, a small heat pump, not shown, may be installed in the crawl space with its output directed into the chase 58. Because such a heat pump uses the earth-moderated air as a heat source, its efficiency is profoundly enhanced compared to identical units mounted outside of the structure.

In order to circulate heat from elements H and H' through the chase 58, a blower or fan 72 is mounted in the chase directly above the vent 65 providing preheated air from the vicinity of heat source H. An exhaust vent 74 with fan 74' is mounted in the upper roof section preferably at the highest point in the upper roof section. Another fan 75 at the upper end of the chase beneath the roof sections aids in the circulation or flow of air either through the envelope system and through the chase in a manner to be described. A damper 76 is disposed in the upper end of the chase 58 beneath the fan 75. In order to circulate warm air through the chase and envelope system, the fan 75 is operative when activated to deliver solar-heated air from the greenhouse and upper parts of the house downwardly through the chase and through the air vents 62, 63 and 64 into various living spaces of the house. Circulation of the warm air from the upper roof or attic portion will also serve to induce circulation of air in a circular pattern to the front and rear envelope sections through vent 61 in order to maintain most even air distribution and consistent temperatures throughout.

When the lower fan 72 is activated, it will cause air to be drawn from the vicinity of the element H on the lowest living level and discharge it in an upward direction through the chase and over the heated pipes H'. The movement of the air will cause the damper 76 to swing upwardly and to close so that all of the air heated by heat sources H and H' is circulated directly into the rooms as required. The temperature of the air in the crawl space being moderated by the earth-coupling effect; i.e. being in open communication with the earth below the frost line will substantially reduce the heating and cooling demands on the entire system by moderating the temperature of all the living space perimeter walls, since their lowest temperature is the mean temperature of the geographical region in which the dwelling is located. While their highest temperature be that provided by continuous daytime circulation and air heated by the greenhouse and clerestory, the passive solar heating system as described also provides direct radiation gain which is stored in the thermal mass 55 in the greenhouse which the natural heat stored in the lower space can be utilized to warm the envelope, any backup heat which is generated, such as, by solar radiation or other heat source will first warm the living spaces, which best retain heat, being buffered by the envelope from adjacent contact with outside air sources. Heating of the entire dwelling can be augmented when necessary by the passive solar heating system and auxiliary heat sources simply by regulation of the fans. Conversely, in the summer the cooling system can be utilized to reduce the temperature level in the living spaces in the manner described. In this relation, the principles of the present invention could be readily utilized with a crawl space or basement, and with or without solar heating such as the passive solar heating system described. In the absence of solar heating requirements, the outer skin or building wall of the structure could be opaque and insulated so as to most effectively isolate the envelope from the temperature changes in the outside air.

It is therefore to be understood that various modifications and changes may be made in construction and arrangement of parts comprising the present invention as well as its application to various housing and building structures without departing from the spirit and scope as defined by the appended claims.

I claim:

1. In a building structure having a ground floor, exterior sidewalls and a roof forming an enclosure with room air spaces therein, inner walls spaced inwardly of said exterior walls and roof to define an air circulating envelope therebetween, said envelope being in communication with a lower space beneath said ground floor level and which space is in heat transfer relation to the earth, the improvement comprising a chase extending upwardly from open communication with said lower space into communication with said air circulating envelope at a point intermediately along the interior of said roof structure, said room air spaces flanking said chase, and vent means between said chase and said room air spaces, at least a portion of one of said exterior sidewalls and roof having a solar energy transmitting panel exposed to solar radiation and in heat transfer relation to said air circulating envelope, said roof including upper and lower roof sections, said clerestory disposed between said upper and lower roof sections exposing an interior portion of said building structure to solar radiation, and air circulating means communicating with said chase and operative to cause the circulation of air in a closed continuous path through said chase, said air circulating envelope and said lower space.

2. In a building structure according to claim 1, said air circulating means including first and second blowers, each operative to circulate air in an opposite direction through said chase.

3. In a building structure according to claim 1, said lower space being in earth-coupled relation insulated from frost.

4. In a building structure according to claim 3, including an air duct in direct communication between the exterior of said building structure and said lower space.

5. In a building structure according to claim 1, including a solar energy transmitting panel extending along an exterior sidewall portion of said building structure so as to expose a portion of said lower space to solar light.

6. In a building structure according to claim 5, that portion of said lower space exposed to solar light including a thermal storage floor mass spaced beneath said ground floor directly coupled to the earth and in heat transfer relation thereto.

7. In a building structure according to claim 6, said thermal storage floor mass being insulated from the frost line of said building structure.

8. In a building structure according to claim 1, said chase having auxiliary heating means in communication therewith and air circulating means for distribution of air under positive pressure in a predetermined direction through said chase.

9. In a building structure according to claim 1, including an exhaust fan on said roof in communication with said envelope, said exhaust fan including air circulating means to withdraw air from said envelope to the exterior of said building structure.

10. In a building structure having a ground floor, exterior sidewalls and a roof forming an enclosure, inner spaced walls extending in inner spaced relation to said exterior walls and roof to define a continuous air circulating envelope therethrough, said envelope being in communication with a heat storage area beneath said ground floor level and in heat transfer relation to the earth, the improvement comprising:

a chase including air circulating means in said chase for the circulation of air through said envelope;
   an exterior portion of said building having a solar energy transmitting panel exposed to solar radiation and in heat transfer relation to said air circulating envelope;
   said roof including upper and lower roof sections, a clerestory between said upper and lower roof sections exposing an interior portion of said building structure to solar light;
   room air spaces flanking said chase, and vent means between said chase and said room air spaces; and
   an exhaust fan on said roof in communication with said envelope, said exhaust fan including air circulating means to withdraw air from said envelope to the exterior of said building structure.

11. In a building structure according to claim 10, said air circulating means including first and second blowers, each operative to circulate air in an opposite direction through said chase.

12. In a building structure according to claim 10, a lower space in earth-coupled relation with the stable temperature of earth below the frost line of said building structure, and an air duct in direct communication between the exterior of said building structure and said lower space.

13. In a building structure according to claim 12, including a solar energy transmitting panel extending along an exterior sidewall portion of said building structure exposing a portion of said lower space to solar radiation, that portion of said lower space exposed to solar radiation including a thermal storage floor area spaced beneath said ground floor directly coupled to the earth and in heat transfer relation thereto.

14. In a building structure according to claim 13, said heat storage floor mass being in open communication with said crawl space.

15. In a building structure according to claim 10, a chase having auxiliary heating means in communication therewith and air circulating means for distribution of air under positive pressure in a predetermined direction through said chase, said chase extending intermediately between and in communication with the living spaces in said building structure.

16. A housing structure comprising in combination:
   a split level building having a ground floor, exterior sidewalls and upper and lower roof sections forming an enclosure with inner spaced walls extending at least along portions of said exterior walls and roof sections to define an air circulating envelope, and a lower space beneath said ground floor in heat transfer relation to the earth and to said envelope;
   a solar energy transmitting panel extending along the southerly exposed portion of said building including a steeply pitched energy transmitting panel section extending from a vertical exterior wall into said lower roof section;
   a clerestory facing in a southerly direction and extending between said upper and lower roof sections to expose the northern portion of said building to solar radiation; and
   a chase extending upwardly from communication with said lower space into communication with said air circulating envelope at a point intermediately between said upper and lower roof sections.

17. A housing structure according to claim 16, including living spaces in communication with the said chase.

18. A housing structure according to claim 16, including a thermal storage mass in communication with the said lower space, said thermal storage mass being exposed to light passing through said solar energy transmitting panel along the southern exposed portion of said building.

19. A housing structure according to claim 16, including an air cooling duct extending between said lower space and the exterior of said building.

20. A housing structure according to claim 16, said chase including a glazing panel in the path of light passing through said clerestory onto said northern wall portion of said building.

* * * * *